United States Patent [19]
Wieczorek

[11] Patent Number: 4,763,237
[45] Date of Patent: Aug. 9, 1988

[54] DC/AC/DC POWER CONVERSION SYSTEM INCLUDING PARALLEL TRANSFORMERS

[76] Inventor: John P. Wieczorek, 26 Alhambra Avenue, Toronto, Ontario, Canada, M6R 2S5

[21] Appl. No.: 919,961

[22] Filed: Oct. 17, 1986

[51] Int. Cl.⁴ .......................................... H02M 3/335
[52] U.S. Cl. ...................................... 363/20; 363/71; 363/124
[58] Field of Search ................. 363/200, 21, 71, 124; 307/82, 83

[56] References Cited

U.S. PATENT DOCUMENTS

| | | | |
|---|---|---|---|
| 3,267,350 | 8/1966 | Graham et al. | 323/266 |
| 3,702,434 | 11/1972 | Ryan | 323/266 |
| 3,761,796 | 9/1973 | Jensen | 323/266 |
| 3,818,306 | 6/1974 | Marini | 363/124 |
| 4,025,863 | 5/1977 | Higuchi et al. | 363/25 |
| 4,030,024 | 6/1977 | Chambers et al. | 323/266 |
| 4,034,280 | 7/1977 | Cronin et al. | 363/25 |
| 4,158,224 | 6/1979 | Kreyer et al. | 363/56 |
| 4,251,857 | 2/1981 | Shelly | 363/26 |
| 4,347,560 | 8/1982 | Seiersen | 363/24 |
| 4,503,316 | 3/1985 | Murase et al. | 363/71 |
| 4,564,742 | 1/1986 | Karlsson | 363/71 |
| 4,587,604 | 5/1986 | Nerone | 363/71 |
| 4,618,919 | 10/1986 | Martin | 363/21 |

FOREIGN PATENT DOCUMENTS 0096175  5/1985  Japan ............................. 363/71

OTHER PUBLICATIONS

R. J. Haver, "The Designer's Guide for Switching Power Supply Circuits and Components," *The Switchmode Guide*, Motorola Semiconductors Inc., Pub. No. SG79.

A. Bernstein, "A New High Current Converter Configuration Dramatically Reduces Switching Transistor Stress," Copyright Power Concepts, Inc. 1984, R. Severns, Modern DC to DC Switching Power Supply, pp. 169-171, 1985.

*Primary Examiner*—Patrick R. Salce
*Assistant Examiner*—Jeffrey Sterrett
*Attorney, Agent, or Firm*—Vorys, Sater, Seymour and Pease

[57] ABSTRACT

A power conversion apparatus are disclosed, each having a pair of transformers, each operating in transforming and rebiasing modes, whose primaries are joined in parallel and are alternately energized by way of a control circuit. Methods are also disclosed for converting power, utilizing a pair of transformers.

17 Claims, 9 Drawing Sheets

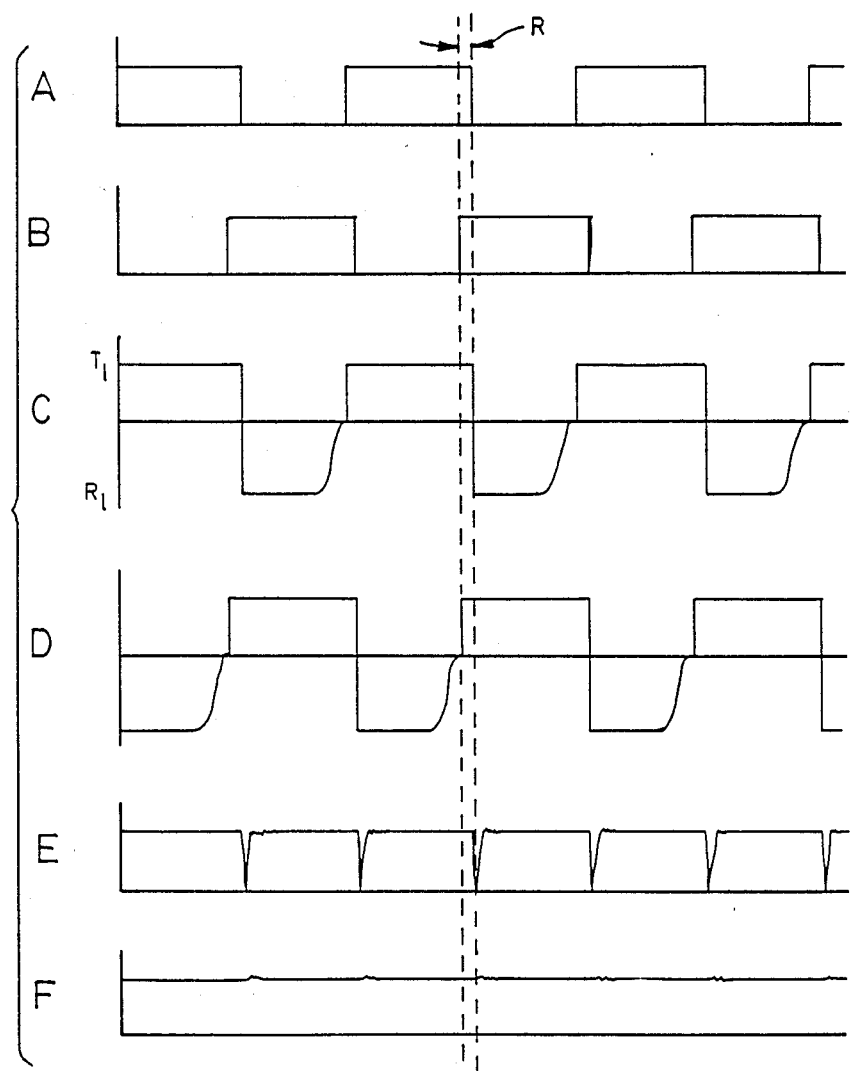
Figure 3   Waveforms

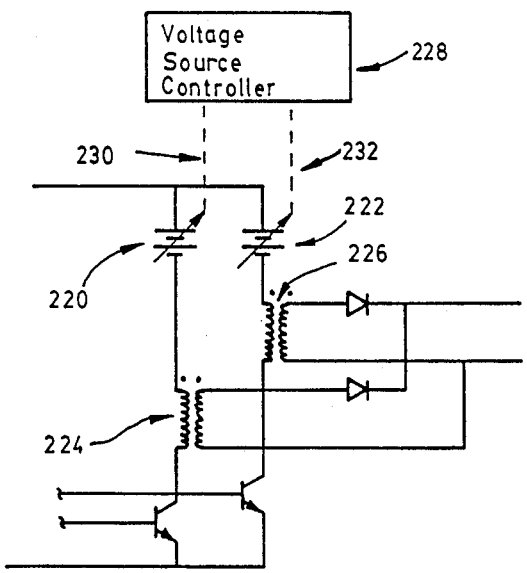
Figure 8a  Voltage Source Placement
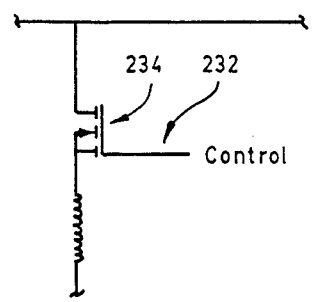
Figure 8b
Negative Voltage Source
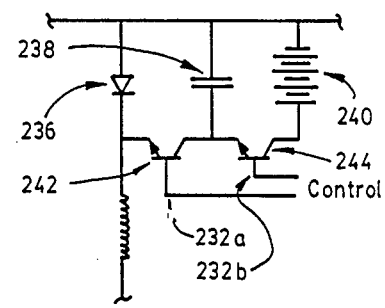
Figure 8c
Positive Voltage Source

DC/AC/DC POWER CONVERSION SYSTEM INCLUDING PARALLEL TRANSFORMERS

BACKGROUND OF THE INVENTION

The present invention relates to power supplies and, more particularly to, switching power supplies.

Power supplies are a common feature in electrical hardware and are used to process a source power into a more usable form, with voltage and current levels compatible with the electrical circuitry, termed the "load" to which they are connected. Typically such processing includes voltage current transformation, output voltage stabilization and electrical line load isolation.

A particular component of the power supply is the transformer which not only converts the input power from typical source voltage and current levels to a transformed output power at a transformed output voltage and current level but also electrically isolates the load from the supply lines.

However, transformers have the disadvantage of being intrinsically incapable of continuous operation. Typically the discontinuity in their operation is compensated for by the addition of energy storage circuits, that is "filters", on the power supply outputs. The term "filter" is drawn from the fact that they filter out the AC component or "ripple" out of the power delivered to the load.

Developments in power supplies have resulted in switching power supplies that operate at frequencies independent of and often much higher than their input power line frequencies. This is in part due to the fact that such higher operating frequencies result in the use of cheaper and smaller components. However, such reductions are not as pronounced in some high frequency switching power supplies, particularly those adapted for high current low voltage power production.

Further developments particularly in high power units have led to switching power supplies in which voltage regulation is performed prior to the transformers and, the transformer is used in a near continuous fashion by operating it in a bi-directional mode. This leads to further, moderate size and cost reductions in the output filters, with low voltage or high current filters once again benefitting least.

However, switching power supplies that utilize their transformer in a bi-directional fashion suffer from several disadvantages. Firstly, the control circuits must guarantee that its operation is balanced, or else the average core flux will become non-zero, and if left unchecked will proceed towards a saturation limit. Secondly, where near continuous operation is the goal the control circuits must simultaneously attempt to minimize the duration of the "change-over" gap while insuring that no overlap occurs, since any overlap can easily lead to a catastrophic circuit failure. Lastly, in low voltage, high current power supplies, the conventional two turn, center tapped secondary is mechanically difficult, clumsy and expensive due to the thickness and stiffness of the wire used.

SUMMARY OF THE INVENTION

It is therefore an object of the present invention to obviate or mitigate the above-mentioned disadvantages by providing a novel form of power supply.

Broadly stated, the invention comprises a power conversion apparatus comprising:

a pair of power conversion means, each including a transformer having a primary to receive an input power and a secondary to deliver a transformed output power, each of said power conversion means being operable in a transforming mode wherein said transformer transforms said input power, and a re-biasing mode during which the transforming capability of said transformer is restored, each of said primaries being arranged to receive said power from a power source and each of said secondaries being connected to an output for delivery of said transformed output power thereto, said power conversion means being responsive to a control signal to energize alternately said transformers.

In another aspect of the present invention, there is provided a method of continuously converting power, comprising the steps of:

receiving an input power;

transforming said input power by way of a first transformer for a first period of time, during which the flux density of said first transformer is increased from first initial value to a first maximum value below the saturation point of said first transformer;

transforming input power by way of said first transformer and a second transformer for a second period of time, during which time the flux density of said second transformer is increased from a second initial value toward a second maximum value below the saturation point of said second transformer, said second period of time being a fraction of said first period of time;

re-biasing said first transformer for a third period of time, wherein the flux density of said first transformer is restored to said initial level, and maintaining the transforming of said input power by way of said second transformer for said third period of time, during which the flux density of said second transformer is increased to said second maximum value, and rebiasing said second transformer for a fourth period of time, wherein the flux density of said second transformer is restored to said second initial level.

In yet another aspect of the present invention, there is provided a method of converting power comprising the steps of:

receiving an input power;

transforming said input power by way of a first transformer for a first period of time to yield a transformed output power;

rebiasing said first transformer for a second period of time;

transforming said input power by way of a second transformer for a third period of time to yield a transformed output power, and, rebiasing said second transformer for a fourth period of time.

alternating said transformed output power from said first and second transformers, so as to provide a substantially even flow of power with respect to time.

Further features, objects and advantages of the present invention will be evident from the following detailed description, given by way of example only, of preferred embodiments, as illustrated in the appended drawings:

BRIEF DESCRIPTION OF THE DRAWINGS

FIG. 3 is a graphical illustration of the operation of the switching power supply of FIG. 1.

FIGS. 8a, 8b and 8c are schematic views of portions of still other switching power supplies.

Referring to FIG. 1, a switching power supply is represented by 10 and receives a rectified power from a power source on input 12 and delivers power on output 14 which is in a high current low voltage condition.

DESCRIPTION OF THE PREFERRED EMBODIMENTS

Figure 1:
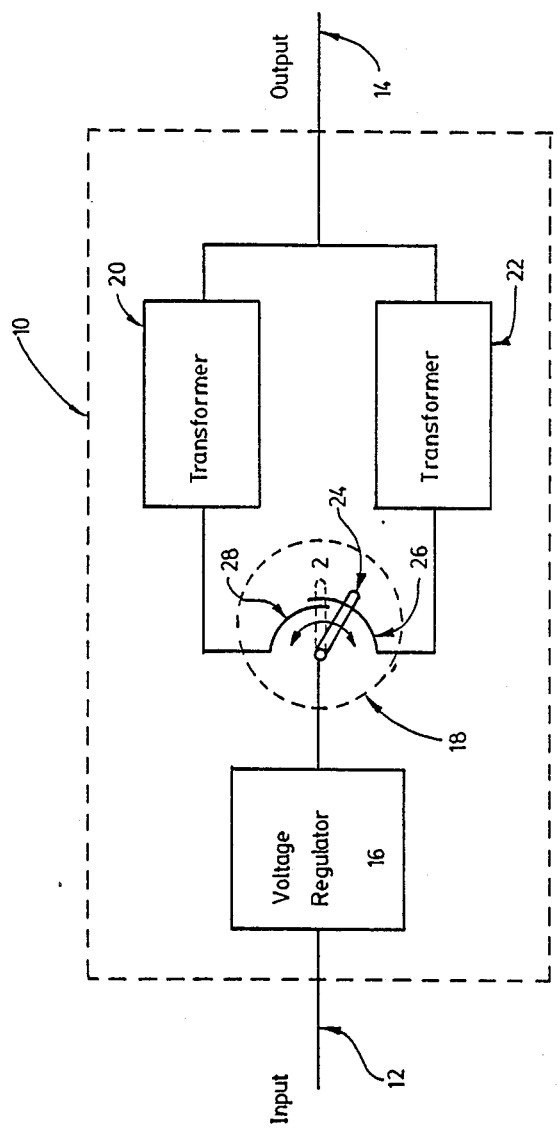
FIG. 1 is a schematic functional representation of a switching power supply.

Receiving the input power on input 12 is a voltage regulator 16 which regulates the input power and generates a DC output having a slight ripple in the voltage level. The regulated power is then directed to a switching circuit symbolically illustrated at 18, which transmits the regulated power to a pair of transformers 20 and 22 in a predetermined alternating sequence, as will be described. Each of the transformers 20 and 22 transmits a transformed high current low voltage DC output to output 14.

As is symbolically represented, the switching circuit 18 controls the transformation of power by the transformers 20 and 22 by way of a sequence which is characterized by an overlapping region. By analogy, this sequence is represented by the oscillation of a link shown at 24, during which the link 24 alternatively makes contact with leads 26 and 28 which are coupled with the input of transformers 20 and 22 respectively. The overlapped region of the sequence is defined by the central position of the link, identified at "2", where the link contacts both leads 26 and 28, thereby representing the period of time during which both transformers 20 and 22 are activated. It is the inclusion of this period of overlap which provides the near continuous conversion of power by the power supply 10.

Figure 2:
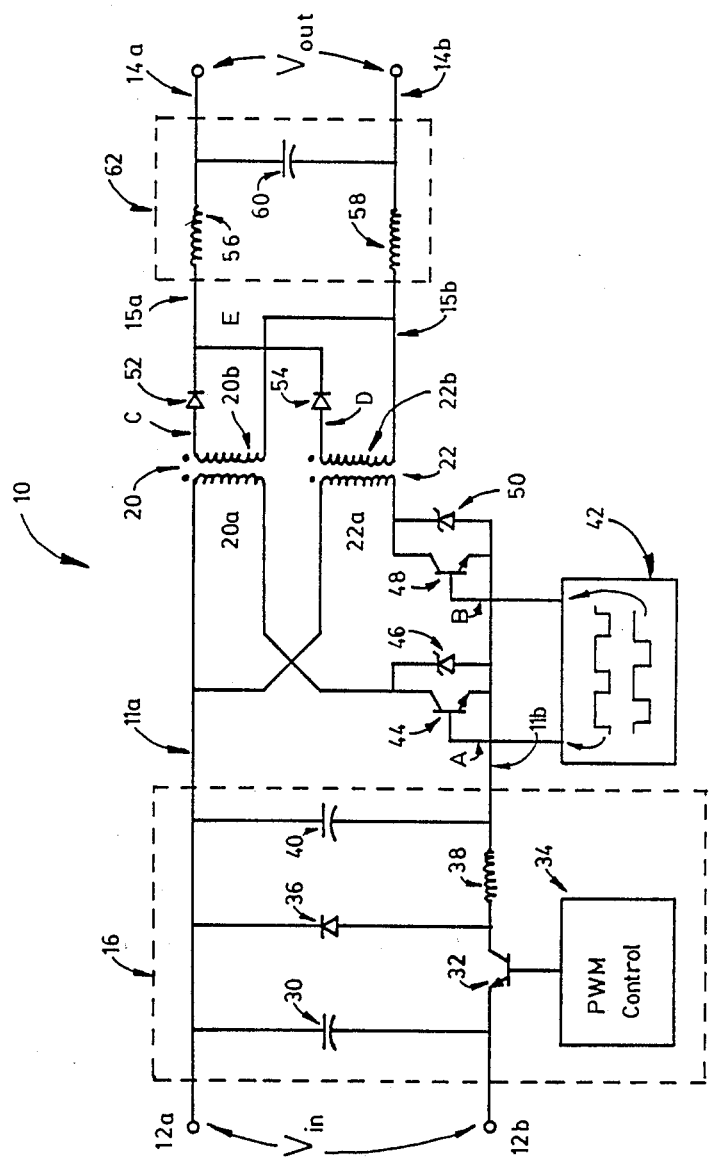
FIG. 2 is a schematic view of the switching power supply represented in FIG. 1.

The implementation of the switching power supply 10 is shown in detail in FIG. 2, wherein input power is received on input lines 12a and 12b and transformed power is delivered on output lines 14a and 14b. The voltage regulator 16 is the well known "buck" switching regulator type having input lines 12a, 12b for receiving input power and output lines 11a, 11b for the delivery of regulated voltage to the transformers 20, 22. Voltage regulator 16 includes an input capacitor 30, a switching transistor 32, a pulse width modulation (PWM) control unit 34, an inductor 38, and output capacitor 40. The PWM control unit 34 controls the duty cycle of the transistor 32, which in cooperation with the input voltage level, dictates the output voltage of the voltage regulator 16. In this case the PWM control unit 34 is designed to maintain the output voltage of the switching power supply 10 at a constant level.

The voltage regulator 16 provides power to the two transformers 20, 22 via lines 11a, 11b. To control the operation of the transformers 20, 22 switching transistors 44, 48 are placed in series with their primary windings 20a, 22a respectively. The base terminals of each of transistors 44, 48 are joined to respective outputs of an overlapping square wave generator 42. In parallel with each switching transistor 44, 48 are Zener diodes 46, 50 respectively which control to safe levels for the transistors, the voltages during rebiasing of a transformer. In addition, the Zener diodes 46, 50 allow for an increased voltage during rebiasing which has particular advantages as will be described.

One polarity terminal of each of the secondaries 20b, 22b is connected to line 15b, while the other polarity terminal of each of secondaries 20b, 22b is joined with the anode of the respective one of a pair of diodes 52, 54. The diodes 52, 54 prevent the backflow of current in the respective transformer during a rebiasing condition as will be described, and have cathodes which are tied in common to line 15a. The transformers 20, 22 are both polarized such that when a given transformer's control transistor is closed, the voltage generated on the secondary terminal leading to the anode of its respective diode will be positive.

The lines 15a, 15b are joined with an output filter 62, which serves to attenuate any voltage ripple present on lines 15a, 15b, and presents a smoothed output to output lines 14a, 14b. The components of the filter 62 include a pair of inductors 56, 58 placed between lines 14a, 15a and 14b, 15b respectively, and a capacitor across lines 14a, 14b.

A particular feature of the switching power supply 10 is its near continuous conversion of input power to a high current low voltage output power, by sequentially directing the input power to the pair of transformers 20 and 22, which are autonomous in operation with respect to one another, and by establishing an overlap in the operation of the transformers during the switching transition.

During operation of the switching power supply 10, input power is first regulated to a near constant level by voltage regulator 16. The slightly rippled output from the voltage regulator 16 is then transmitted to the respective primary of the transformers 20 and 22, the operation of which being dependent on the signalling of the overlapping square wave generator 42.

The overlapping square wave generator 42 provides alternating high and low signals on each of the transistors 44, 48 as is shown in curves "A" and "B" in FIG. 3. The low and high signals direct transistors 44, 48 to open and close respectively the primary winding circuits 20a, 22a of the respective transformers 20, 22. The transition of the signals from high to low, however, is delayed in order to define an overlapping transition region identified at "R" where both of the transistors are on. Such an overlapping transition is indicative of the duty cycle of each transformer being greater than 50% and in this case 54%. With both transformer duty cycles being over 50% substantially continuous conversion of power is assured.

A particular feature of the circuit in the rebiasing voltage identified at "$R_L$" which is relatively higher than the transforming voltage identified at "$T_L$". This is done to enable the time period for the rebiasing phase to be reduced in order to increase the duty cycle beyond 50% and is provided by way of the Zener diodes 46, 50.

The transformers 20, 22 each operate in a cyclic fashion, beginning with a transforming mode where the input power is passed from the respective primary to the respective secondary to generate a high current low voltage power output on the secondary. During the transforming mode the permeability of the core remains relatively high and usable for 12 us of which only 10 us are utilized to ensure a sufficient safety factor against saturation. The second part of the cycle is the re-biasing mode, in which the flux of the core is returned to approximately a zero level, thereby preparing the transformer for another transforming mode.

Considering the operation of transformer 20, a "high" signal issued by the overlapping square wave generator 42 to transistor 44 closes the primary circuit 20a and presents power to the primary winding, which subsequently results in a high current low voltage power leaving the transformer on the secondary 20b. When the transistor receives a "low" signal from the overlapping square wave generator 42, the transistor 44 opens the primary circuit 20a and places the transformer 20 in the rebiasing mode, at which time the voltage in the secondary 20b immediately falls to the negative region, commensurate with the onset of flux dissipation in the core. As shown by curve "C" for transformer 20 and curve "D" for transformer 22, the return of the secondary voltage to zero indicates the completion of flux dissipation, and thus the transformer's readiness for the next transforming mode.

The output power emerging from each of the secondaries 20b, 22b is passed through the diodes 52, 54 onto lines 15a, 15b as shown in curve "E". A particular feature in the switching power supply, as evidenced by the curve "E" is the presence of parasitic inductance in the windings of transformers 20, 22 which causes a sudden reversing voltage surge in the output curve when either of the transformers is switched to a rebiasing mode. This reversing voltage surge is seen as a spike in the curve "E" at the termination of each overlap period, indicating that the recently activated transformer is unable to convert a sufficient quantity of power to satisfy the circuit to which it is connected.

In this case, the parasitic inductance, inherent in the recently activated transformer inhibits an immediate start-up. However, as is evidenced by the brevity of the voltage surge, the recently activated transformer very quickly restores power in output line 15.

Such a voltage spike, being unacceptable by the majority of users, must as in all conventional switching power supply circuits in use, be filtered out. Thus, the power on lines 15a, 15b is sent to output filter 62. The final output appears on lines 14a, 14b and is shown in curve "F".

As well, the relatively short duration of the voltage spike enables the output filters to be of a relatively small size, thus yielding substantial savings in space, efficiency and expense over conventional filters.

Figure 4A:
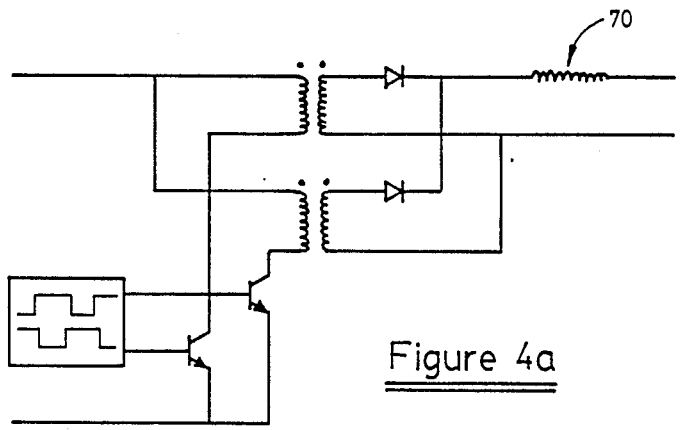
FIGS. 4a and 4b are schematic views of portions of alternative switching power supplies.
Figure 4B:
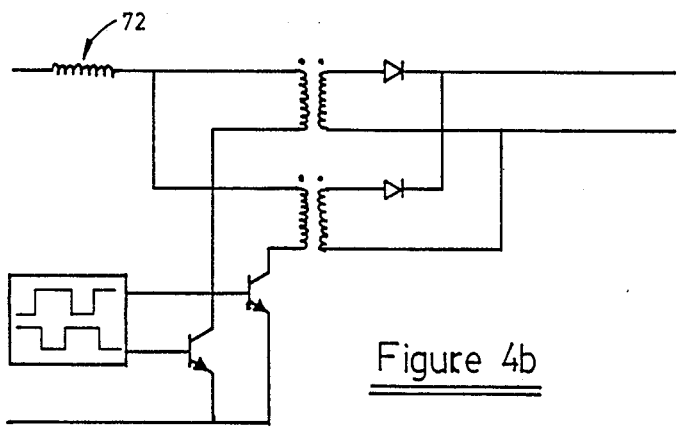

In yet other embodiments, as shown in FIGS. 4a and 4b inductors 70, 72 are placed in series with the output and input lines respectively of the transformers. This is in order to reduce the transformers' power conversion start delays, due, as described previously, to parasitic inductances.

In the case of FIG. 4a, currents become established in inductor 70. If, however, at any time a circuit element attempts to disrupt these established currents, the inductor will generate a voltage surge to force current through the circuit. Such a current disruption occurs immediately after the overlap period when one transformer is switched off by its transistor and the other is not yet converting power since parasitic inductances have impeded the establishment of currents. Under the circumstances the inductor 70 will attempt to force current through both transformers by way of a voltage surge, thereby causing current flow through the activated one. It is this voltage surge that reduces the conversion start delay because the delay duration is inversely proportional to applied voltage.

As shown in FIG. 4b, the inductor 72 is placed before the transformers the voltage surge will be positive and will attempt to force current into the primaries. Conversely, if the inductor is after the transformer, as with inductor 70 in FIG. 4a, it will generate a negative voltage and attempt to draw current out of the secondaries.

It should be noted here that in some instances, the placement of inductors in either the primary or secondary is illustrated in FIGS. 4a, 4b is not necessary since each circuit has other inherent inductances, which may perform the role of inductors 72, 74 to overcome the above-mentioned parasitic inductances. This is particularly the case where circuits are provided with output filters, for example filter device 62 in power supply 10.

Figure 5:
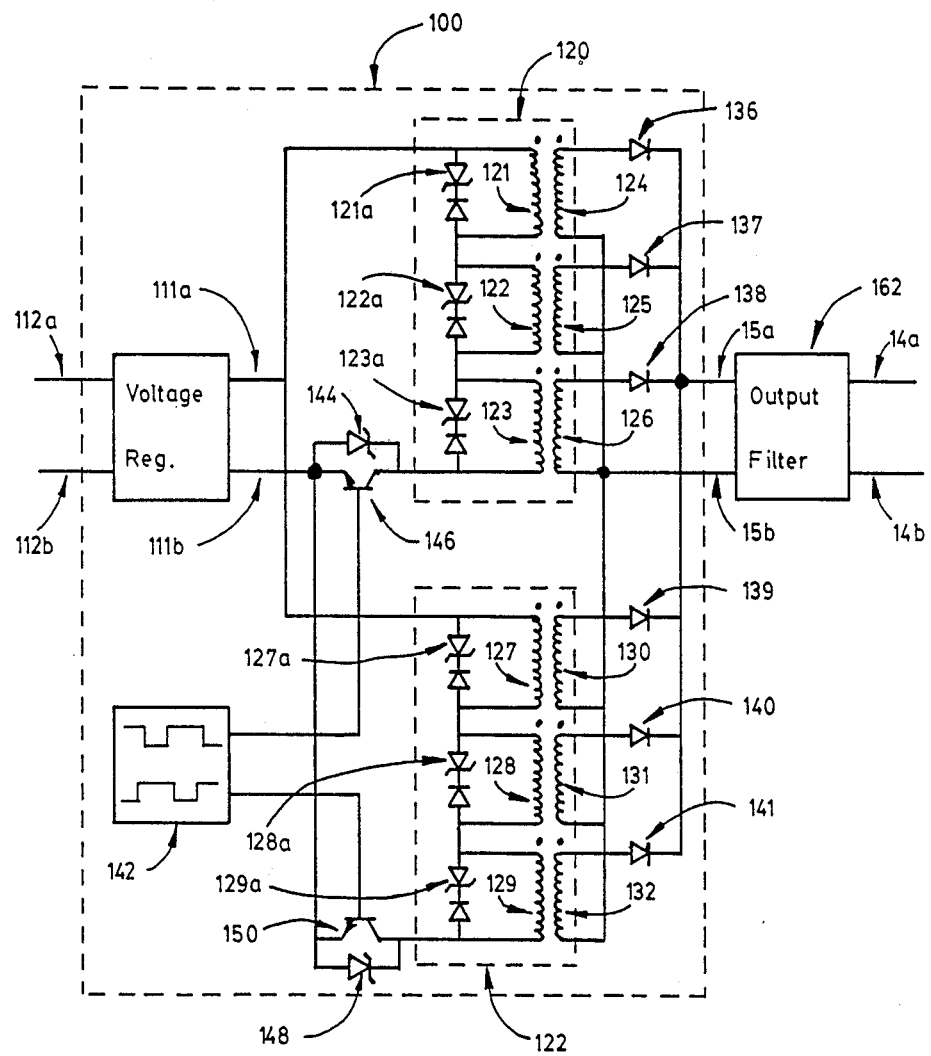
FIG. 5 is a schematic view of another alternative switching power supply.

In another embodiment as shown in FIG. 5, a switching power supply 100 has input lines 112a and 112b which carry the input power to voltage regulator 116. Coupled to the output lines 111a, 111b respectively of voltage regulator 116 are primaries 121, 122, 123 and 127, 128, 129 of transformer sets 120, 122, which are identical and respectively include secondaries 124, 125, 126, and 130, 131, 132.

Also located in parallel with each primary is a voltage clamp identified at 121a, 123a and 127a to 129a. Each voltage clamp comprises a Zener diode in series with a conventional diode and protects the respective transformer from voltage surges caused by unequal biasing currents. These occur as a result of varying inductances between the transformers, which are typically caused by manufacturing tolerances and temperature drifts.

As in the previous embodiment, the switching function is provided by a transistor-diode arrangement 144, 146, and 148, 150 in the respective primary circuits of transformer sets 120, 122 and a square wave generator 140 providing alternating signals to transistors 146 and 150.

The switching power supply 100 is particularly adapted for the conversion of power to a high current low voltage condition. In this case, the primaries in the respective transformer sets 120, 122 are joined in series to ensure an equal current flow through each primary within a respective set. Moreover, the identical nature of the transformers 120, 122 ensures that there are equal current flows through the respective primaries, and that a substantially identical current is passed through the secondaries which are respectively joined in parallel. Furthermore, the secondaries are respectively coupled with diodes 136 to 141, having identical characteristics. Thus, the transformer sets 120, 122 are arranged to ensure current balancing through each of the secondaries 124, 125, 126, and 130, 131, 132 respectively.

Moreover, the diodes 136 to 141 are each required to carry only an equal portion of the total current load. For example, diodes 136, 137 and 138 respectively carry currents $i_{1a}$, $i_{1b}$ and $i_{1c}$, where:

$i_{1a}+i_{1b}+i_{1c}=i_1$, and $i_{1a}=i_{1b}=i_{1c}$.

Thus, the current is shared among several smaller diodes, thereby avoiding the need of expensive higher current diodes.

If desired, more transformers may be used in a transformer set to reduce further the current demand on the diodes, or where a higher output current is desired. In addition, an increased number of autonomous transformer sets may be used in accordance with the present invention in order to reduce the duty cycle of transformer set.

Figure 6:
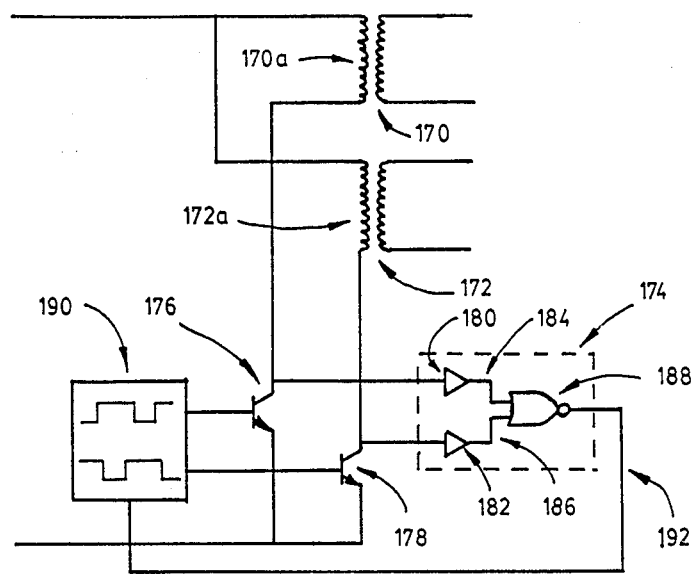
FIG. 6 is a schematic view of a portion of yet another switching power supply.

In a further embodiment shown in FIG. 6, the period of overlap between the transformers shown at 170 and 172 is controlled by an overlap correction circuit shown at 174. In this case the overlap correction circuit 174 receives inputs on conductors 176 and 178 indicating the presence of power flowing through the respective primary 172a and 170a. Such overlap correction is necessary when the timing characteristics of the switching devices used, in this case bipolar transistors 176 and 178, vary significantly.

The overlap correction circuit 174 includes a pair of buffers 180, 182 which are respectively coupled to conductors 176, 178 to condition the input voltage levels into levels safe and compatible for digital logic circuits. Buffers 180, 182 in turn send signals on conductors 184, 186 to a NOR gate 188, which outputs an overlap signal to overlapping square wave generator 190 via conductor 192, the overlap signal indicating when power is flowing through both primaries 170a and 172a. In this manner, the degree of overlap may be adjusted in view of variations in transition timing due to various operating effects, such as temperature.

In addition, overlapping square wave generator 190 is modified to provide adjustment of the overlapping region, thereby enabling the duration thereof to be maintained at a desired value.

If, for example the storage time of the bipolar transistor 176 is too long, then the "on" time period of transformer 172 will extend into its minimum rebiasing period, thus leading to incomplete rebiasing. Conversely, if transistor 176 turns off too early, the operation of transformer 172 will fail to overlap the operation of transformer 170, thus resulting in the addition of a large amount of ripple to the power supply's output.

Switching power supplies using a bipolar transistor at high frequencies thus benefit from the addition of the overlap correction circuit 174 because bipolar transistor storage times vary with collector current, base drive and temperature. Moreover, switching power supplies utilizing power FETS and operating at even higher frequencies may also benefit from the overlap correction circuit 174.

Figure 7:
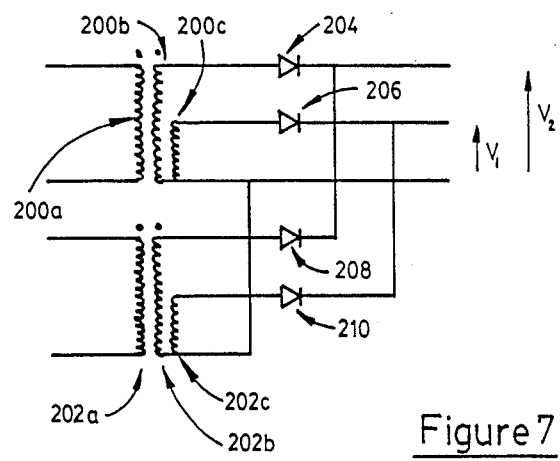
FIG. 7 is a schematic view of another portion of an additional switching power supply.

In a further embodiment as shown in FIG. 7, two pairs of secondaries, 200b, 200c and 202b, 202c are wound with each primary 200a, 202a of transformers 200, 202 and include diodes 204, 206, 208 and 210 respectively.

Although not shown for the sake of brevity, the primaries are coupled in the same manner as in the aforementioned embodiments by way of an overlap signal generator and a transistor-Zener diode combination located in each primary, so as to function with the operating characteristics as identified in FIG. 3. This configuration enables the switching power supply to provide a continuous conversion of power while providing a selection of two transformed outputs with voltages $V_1$, $V_2$.

Alternatively, more than two secondary windings may also be implemented with each primary in order to increase the selection of transformed outputs. In addition, the use of tapped secondaries is also contemplated to obtain the selection of transformed outputs.

Also contemplated is the placement of voltage sources in series with the transformer primaries to allow for individual adjustments in the voltages that are placed on the transformer primaries. As is illustrated in FIG. 8a, voltage source 220, 222 are placed in series with each the primaries for the respective transformer 224, 226. A voltage source control unit 228 is also included to provide variable control via control lines 230, 232, of the voltage levels generated by the respective voltage source 220, 222 and therefore variable control of the voltage across the respective primaries.

FIGS. 8b and 8c show two alternative voltage sources. FIG. 8b shows a negative voltage source 234 comprised of a FET used in a source follower configuration and controlled by the voltage on the control line 232. In contrast, FIG. 8c shows a positive voltage source including a capacitor 236, diode 238 and an inner voltage source 240. In this case, the voltage source alters the voltage in the primary under the action of a transistor 242 which is responsive to a voltage on control line 232a and discharges the capacitor. The capacitor 236 thus provides a short voltage pulse to reduce the turn on delay due to parasitic inductance in the transformer to which it is connected. An additional transistor 244 is also provided which is responsive to a voltage on control line 232b which enables the inner voltage source 240 to recharge the capacitor 238 upon the completion of the delivery of the short voltage pulse, thereby making the capacitor 238 ready for another cycle.

Voltage sources may also be used to force the transfer of current flow from the previously activated transformer to the newly activated transformer during the period of activation overlap by respectively reducing the voltage on one transformer, and/or increasing the voltage and in effect giving a push on the recently activated transformer.

In the event that the output voltages of the transformer-diode sets are unequal, voltage sources may be used to adjust their primary voltages to match the output voltages.

Figure 9:
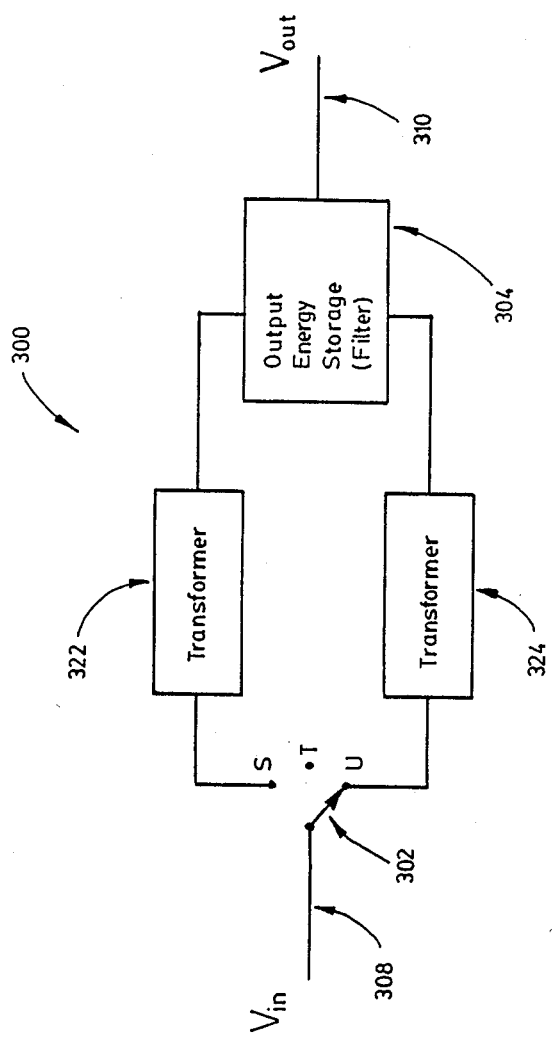
FIG. 9 is a schematic functional representation of another switching power supply.

FIG. 9 illustrates an alternative power supply 300 which unlike the above-mentioned power supply 10 operates with a controlled delay in the power conversion modes of each transformer 322, 324. This is achieved by a circuit which symbolized by switch 302 having three contact positions, labelled "S", "T" and "U". Positions "S" and "U" respectively activate transformers 322 and 324. On the other hand "T" symbolizes a distinct period of operation wherein neither of the transformers 322, 324 functions. Each of the transformers 322, 324 has an output which is coupled with a shared common output filter identified at 304.

Figure 10:
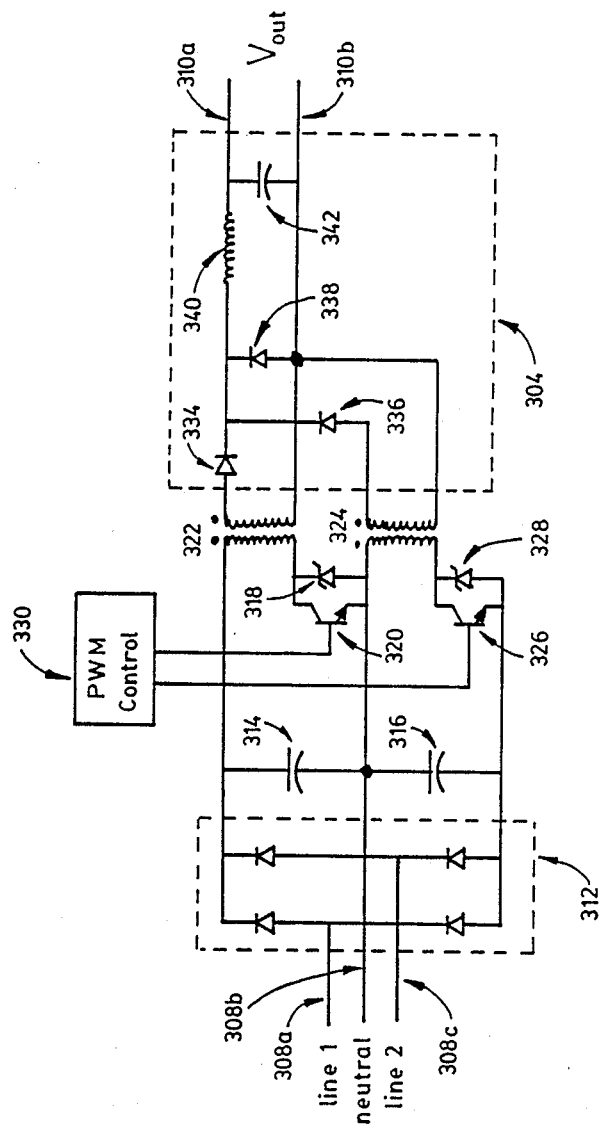
FIG. 10 is a schematic view of the switching power supply represented in FIG. 9.

FIG. 10 is a more detailed schematic of a typical implementation of power supply 300. Input power is received on lines 308a, 308b and 308c, labelled respectively "line 1", "neutral", and "line 2", which in turn are connected to the input filter capacitors 314 and 316 via full wave diode bridge 312. The diode bridge 212 as well as capacitors 314 and 316, are thus used to enable power supply operation from two voltages, typically 110 and 220 VAC.

Connected to the input capacitors 314 and 316 are two autonomous transformers 322, 324 which are alternatively activated by a respective one of transistors 320, 326. As in the above-mentioned embodiments, transistors 320, 326 are controlled by a PWM unit identified at 330. Transistors 320, 326 also have Zener-diodes 318 and 328 joined in parallel therewith to protect against voltage surges. The secondaries of transformers 322 and 324 are respectively connected to diodes 334, 336 and in common to a third diode 338. Filter devices then follow in the form of inductor 340 and capacitor 342.

The switching power supply receives input power on input lines 308a, 308b and 308c which is distributed to each section of the diode bridge 312 to respectively change capacitors 314, 316. The capacitors then distribute power pulses to the primaries of transformers 322, 324 in response to activation of transistors 324, 326. The power pulses, thus seen on the secondaries, are smoothed to a DC output voltage by the various above-mentioned filter devices identified collectively at 304.

The switching power supply 300 has some similarity with the conventional forward converter, but is distinguished therefrom in part by the fact that the power pulses may be sent through either of two transformers 322, 324 instead of just one. In addition, the switching transistors 320, 326 are never subjected to voltages higher than input line voltages, since the autonomous transformer-transistor sets are used, which draw their input power from autonomous power sources which are at half the input line voltage. In this case the autonomous power sources are the two input capacitors 314 and 316 which, in operation, individually hold only half of the total input voltage. This is particularly useful in switching power supply circuits designed to have capability for 220 VAC operation, because transistors rated for 400V may be used. Such transistors are widely available, reliable and fast operating while 800V transistors are far less varied, slower and essentially limited to BJT's.

Also, no symmetry (transformer balance) control is necessary since two autonomous transformers are used. This feature would be particularly difficult to obtain in a single transformer design since the voltages across input capacitors 314, and 316 may vary independently.

A further feature is that both transistors 322, 324 are operated with their respective emitters on fixed voltage points in the circuit. Thus, any drive isolation transformer used to drive these transistors does not have to be built to withstand steep common node voltage changes associated with high side switching.

A particular feature is that the transformer design employed is mechanically simple, thus inexpensive and better suited to high frequency applications.

Also contemplated is the use of transformers having unequal duty cycles. However, such configuration would typically be less efficient and would place the transformers and their respective transistors in different loading conditions.

A further alternative involves the use of other voltage regulation devices such as the "buck", "buck boost" or "Cuk" devices, and many other variations as are well known.

Although suited for conversion of power to a high current low voltage condition, the switching power supply is also applicable in other conversion environments where near continuous conversion is beneficial. This includes conversion to lower current levels, where the voltage regulator may be relocated beyond the secondaries 20b, 22b.

It should also be noted, that in the above described power supplies utilizing an overlap period, the output filter devices are relatively small, since they serve only to remove the slight voltage "ripple" on the output. In contrast, the output filter devices on the power supplies which utilize the controlled delay, for example power supply 300, are relatively larger.

In fact, the output filter devices may be typically 10 to 100 times larger in size since they must be capable of storing energy in order to smooth the output power. In this case, the output filter devices are similar in size to the devices used in conventional forward converters.

Also contemplated is the use of a pair of transformers having their secondaries joined in series, as opposed to a parallel arrangement as above described.

I claim:

1. A power conversion apparatus comprising:
a pair of unipolar transformers having a primary and a secondary, a regulation means coupled to a line source, so as to provide regulated power to said transformers, each of said transformers being operable in a transforming phase wherein said primary receives said regulated power at a transforming voltage level and said transformer transforms said regulated power, and a re-biasing phase during which said primary receives power at a rebiasing voltage level and the transforming capability of said transformer is restored, each of said transformers being responsive to a control signal from a control means, to energize alternately said transformers.

2. An apparatus as defined in claim 1 wherein at any given instant, at least one of said power conversion means operates in said transforming mode, thereby to provide substantially continuous conversion of said power signal.

3. An apparatus as defined in claim 1, wherein said control means is operable to energize said transformers in a sequence defined by a pair of modes, the first mode being characterized by the operation of one of said transformers in said transforming phase and another of said transformers in said re-biasing phase, the second mode being characterized by the operation of a pair of transformers in said transforming phase.

4. An apparatus as defined in claim 3 further comprising overlap sensing means to sense the occurrence of the operation of said transformers in said second mode, said control means being further adapted to vary the time duration of said second mode.

5. An apparatus as defined in claim 4 wherein said overlap sensing means includes a pair of conductors joining said primaries with a signal means, said signal means to issue a signal indicative of said simultaneous operation to said switching means.

6. An apparatus as defined in claim 5 wherein said signal means is a NOR gate.

7. An apparatus as defined in claim 3, wherein said control means includes a transistor having an emitter and a collector in series with a respective one of said primaries.

8. An apparatus as defined in claim 7, wherein said control means further includes:
an overlapping square wave generating means to enable sequentially said transistor to operate in such a manner that said pair of transformers operates in said second mode for a predertermned period of time.

9. An apparatus as defined in claim 1, further comprising output power control means in series with each of said secondaries to inhibit reverse flow of said output power in one of said secondaries during the operation of the respective transformer in said rebiasing phase.

10. An apparatus as defined in claim 9 wherein said output control means is a diode.

11. An apparatus as defined in claim 1 wherein a variable voltage generation means is located in at least one of said primaries and means to vary the voltage generated by said voltage generation means.

12. An apparatus as defined in claim 11 wherein said voltage generation means is a transistor.

13. An apparatus as defined in claim 1 wherein a voltage generation means is located in each of said primaries and is arranged to increase the magnitude of said rebiasing voltage level beyond the magnitude of said transforming voltage level, so as to reduce the time duration of said rebiasing phase relative to said transforming phase.

14. An apparatus as defined in claim 13 wherein said voltage generation means is a Zener diode.

15. An apparatus as defined in claim 1, wherein said primaries of said transformers are joined to a common power source.

16. A method for continuously converting power comprising the steps of:
connecting a pair of unipolar transformers in parallel across an input line and an output line, said pair of unipolar transformers comprising first and second transformers;
providing a controller to control the flow of power to said first and second transformers; and
preregulating power received on said input line so as to provide regulated power to said transformers, wherein said first and second transformers operate in a first mode in which said input power is transformed exclusively by one of said first and second transformers, and a second mode in which both of said first and second transformers operate to transform said input power.

17. A method as defined in claim 16 wherein said first mode has a time duration of about 16 $\mu$s and said second mode has a time duration of about 0.2 to 1.2 $\mu$s.

* * * * *